(12) United States Patent
Kozloski et al.

(10) Patent No.: US 9,157,755 B2
(45) Date of Patent: Oct. 13, 2015

(54) PROVIDING NAVIGATIONAL SUPPORT THROUGH CORRECTIVE DATA

(71) Applicant: International Business Machines Corporation, Armonk, NY (US)

(72) Inventors: James R. Kozloski, New Fairfield, CT (US); Clifford A. Pickover, Yorktown Heights, NY (US); Robert W. Wisniewski, Ossining, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 129 days.

(21) Appl. No.: 13/941,661

(22) Filed: Jul. 15, 2013

(65) Prior Publication Data

US 2015/0019126 A1    Jan. 15, 2015

(51) Int. Cl.
*G01C 21/34* (2006.01)

(52) U.S. Cl.
CPC .................................. *G01C 21/3415* (2013.01)

(58) Field of Classification Search
CPC .. G01C 21/3415; G01C 21/36; G01C 21/362; G01C 21/3635; G01C 21/368
USPC .................. 701/442, 445, 456, 454
See application file for complete search history.

(56) References Cited

U.S. PATENT DOCUMENTS

| | | | |
|---|---|---|---|
| 5,323,321 A * | 6/1994 | Smith, Jr. ...................... | 701/428 |
| 5,459,667 A * | 10/1995 | Odagaki et al. ............... | 701/428 |
| 6,333,702 B1 | 12/2001 | Hiyokawa et al. | |
| 6,710,774 B1 | 3/2004 | Kawasaki et al. | |
| 7,054,744 B2 | 5/2006 | Hirose et al. | |
| 8,209,120 B2 | 6/2012 | Breed | |
| 8,244,463 B2 | 8/2012 | Operowsky et al. | |
| 2002/0042674 A1 | 4/2002 | Mochizuki et al. | |
| 2008/0319660 A1 | 12/2008 | Horvitz et al. | |
| 2012/0197522 A1 | 8/2012 | Fukuhara | |
| 2012/0283946 A1 | 11/2012 | Doan et al. | |

OTHER PUBLICATIONS

Bradley et al.; U.S. Appl. No. 13/535,121, entitled: "Navigation system providing a super detail mode of operation to assist user's driving", filed Jun. 27, 2012.
Mell et al., "The NIST Definition of Cloud Computing", Version 15, Oct. 7, 2009, National Institute of Standards and Technology, Information Technology Laboratory.
Hunt et al., "Drivers With Dementia and Outcomes of Becoming Lost While Driving", The American Journal of Occupational Therapy, Mar./Apr. 2010, vol. 64, No. 2, pp. 235-232.

(Continued)

*Primary Examiner* — Richard Camby

(74) *Attorney, Agent, or Firm* — Louis J. Percello; Reza Sarbakhsh

(57) ABSTRACT

A method and system for providing navigational support through corrective data includes monitoring a user's current position and travel pattern. A likelihood that the user is lost may be calculated based on the user's travel pattern and current position. If the likelihood exceeds a threshold value, the user may be provided with corrective data such as photographs or landmark information through visual or audio communication to assist the user in taking a corrective action or preventing getting lost.

19 Claims, 7 Drawing Sheets

(56) References Cited

OTHER PUBLICATIONS

TUFO, "Daily Tip: How to map a calendar event location", iMore, Feb. 1, 2011, http://www.imore.com/2011/02/01/daily-tip-map-calendar-event-location/, pp. 1-7.

Zahradnik, "Download and Manage Garmin Car GPS Maps and Software", http://gps.about.com/od/gpsmapscharts/a/garmin_maps.htm, Accessed on Jan. 23, 2015, pp. 1-4.

* cited by examiner

PROVIDING NAVIGATIONAL SUPPORT THROUGH CORRECTIVE DATA

FIELD

The present application relates generally to computer applications and systems and more particularly to navigation and mapping applications and systems.

BACKGROUND

Existing navigational support solutions monitor a user's position on a map, and may allow the user to select a point of origin and a destination to obtain a recommend a route. These solutions may monitor the user along the recommended route and suggest a new one if the user deviates from recommended route. These solutions do not recognize patterns in the user's travel, are not proactive, and depend on there being a recommended path. They also offer only limited assistance in taking corrective action and lessening the likelihood of being lost in the future.

BRIEF SUMMARY

A method for providing navigational support on a computer device, according to an exemplary embodiment of the invention, monitors a user's travel pattern and current position on a map. It determines a probability that the user is lost based on the user's travel pattern and current position, and provides the user with a plurality of corrective data if the probability that the user is lost exceeds a threshold, for aiding the user in taking a corrective action or to avoid getting lost.

A system for providing navigational support on a computer device, according to an additional exemplary embodiment of the invention, includes a computer having a processor and a computer-readable storage device, and a program embodied on the storage device for execution by the processor. The program may have a plurality of program modules configured to monitor a user's travel pattern and current position on a map, determine a probability that the user is lost based on the user's travel pattern and current position, and provide the user with a plurality of corrective data if the probability that the user is lost exceeds a threshold, for aiding the user in taking a corrective action or to avoid getting lost.

A computer program product for providing navigational support on a computer device, according to a further exemplary embodiment of the invention, includes a computer-readable storage medium having program code embodied therewith. The program code is readable/executable by a processor of a computer to perform a method comprising. Steps of the method include monitoring a user's travel pattern and current position on a map and determining a probability that the user is lost based on the user's travel pattern and current position. The steps of the method may further include providing the user with a plurality of corrective data if the probability that the user is lost exceeds a threshold, for aiding the user in taking a corrective action or to avoid getting lost.

DETAILED DESCRIPTION

Figure 1A:
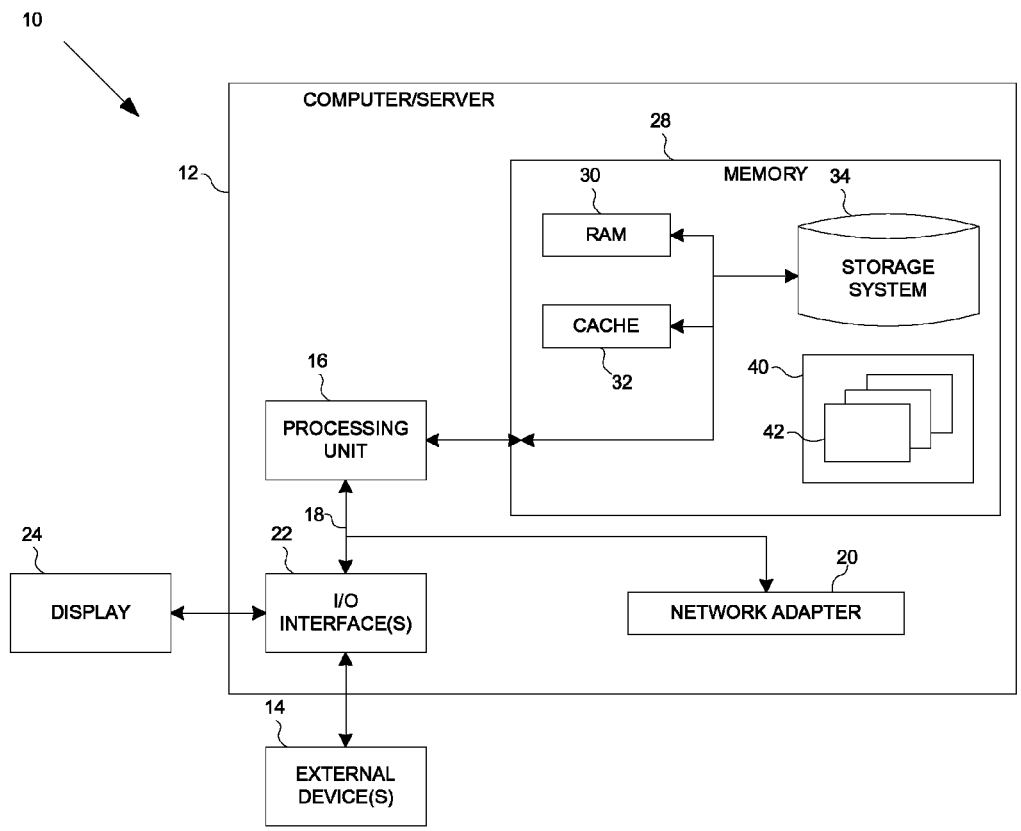
FIG. 1A is a schematic block diagram of a computer system for implementing a method, according to an embodiment of the invention.

Referring to FIG. 1A, a schematic of an exemplary computing system is shown. The computer system 10 is one example of a suitable computer system and is not intended to suggest any limitation as to the scope of use or functionality of embodiments of the invention described herein.

In the computer system 10, shown in FIG. 1A, a computer/server 12 is operational with numerous other general purpose or special purpose computing system environments or configurations. Examples of well-known computing systems, environments, and/or configurations that may be suitable for use with the computer/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer/server 12 may be described in the general context of computer system-executable instructions, such as program modules, being executed by the computer system 10. Generally, program modules may include routines, programs, objects, components, logic, data structures, and so on that perform particular tasks or implement particular abstract data types. The computer/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1A, the computer/server 12 in the computer system 10 is shown in the form of a general-purpose computing device. The components of the computer/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 12 typically includes a variety of computer system readable media. Such media may be any available media that is accessible by the computer/server 12, and it includes both volatile and non-volatile media, removable and non-removable media.

The system memory 28 can include computer system readable media in the form of volatile memory, such as random access memory (RAM) 30 and/or cache memory 32. The computer/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

The program/utility 40, having a set (at least one) of program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer/server 12 may also communicate with one or more external devices 14 such as a keyboard, a pointing device, a display 24, etc.; one or more devices that enable a user to interact with the computer/server 12; and/or any devices (e.g., network card, modem, etc.) that enable the computer/server 12 to communicate with one or more other computing devices. Such communication can occur via Input/Output (I/O) interfaces 22. Still yet, computer the system/server 12 can communicate with one or more networks such as a local area network (LAN), a general wide area network (WAN), and/or a public network (e.g., the Internet) via a network adapter 20. As depicted, the network adapter 20 communicates with the other components of the computer/server 12 via the bus 18. It should be understood that although not shown, other hardware and/or software components could be used in conjunction with the computer/server 12. Examples, include, but are not limited to: microcode, device drivers, redundant processing units, external disk drive arrays, RAID systems, tape drives, and data archival storage systems, etc.

Figure 1B:
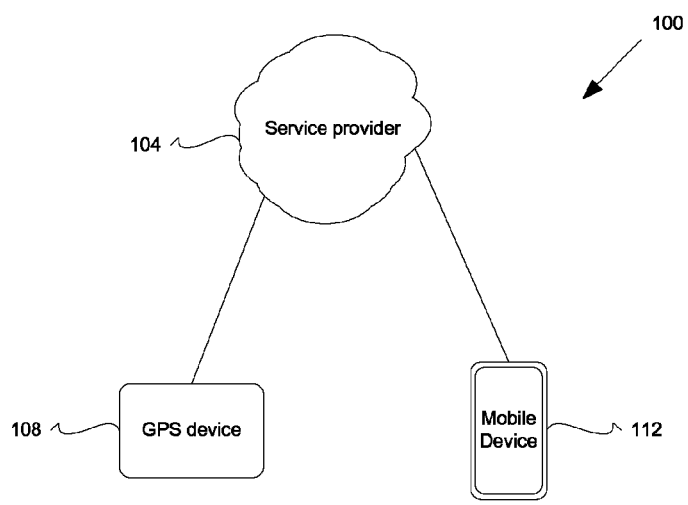
FIG. 1B is a schematic block diagram of a computing environment for offering navigational support, according to an embodiment of the invention.

Referring now to FIG. 1B, a schematic of an exemplary computing environment 100 is shown. The disclosed embodiment may include a service provider 104 that provides navigational services to consumer devices such as GPS units 108 (which may be installed in cars or other vehicles) or handheld mobile devices 112. These and other devices that may communicate with the service provider 104 may be, for example, a system 10 as described in connection with FIG. 1A. Such a device may have a display and one or more physical or virtual keys that control and direct its functionality, and many of its features and functions may be configurable by a user. The system provider 104 may monitor the position and movement of such a device and provide navigational support. Such monitoring may be performed using technologies that include, without limitation, any satellite navigation system (such as the global positioning system (GPS) maintained by the US and others maintained by other entities). Satellite navigation systems are generally well understood in the art.

Figure 2:
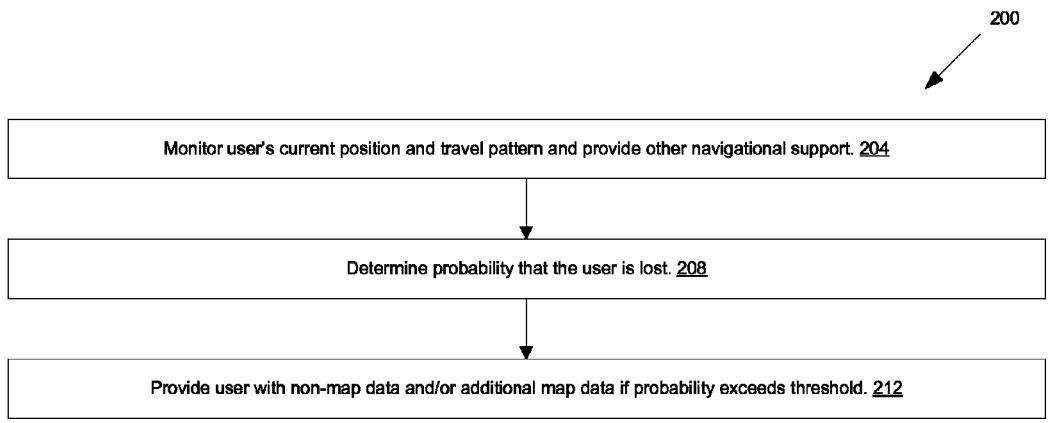
FIG. 2 is a flowchart depicting steps of a method for providing navigational support, according to an embodiment of the invention.

Referring now to FIGS. 1-2, a method 200 according to an embodiment of the disclosed invention monitors a current position and a travel pattern of a user of a system or device such as those described in connection with FIGS. 1A-B, and determines a probability that the user is lost based on the monitored information, and provides the user with corrective data including customary map data, additional map data, and/or non-map data. Among other functions, the method 200 may perform, in step 204, general navigational functions such as providing the user with a map interface on a digital screen. The map may be interactive. It may convey information to the user through various means including, without limitation, digital screens and/or audio channels.

Figure 3:
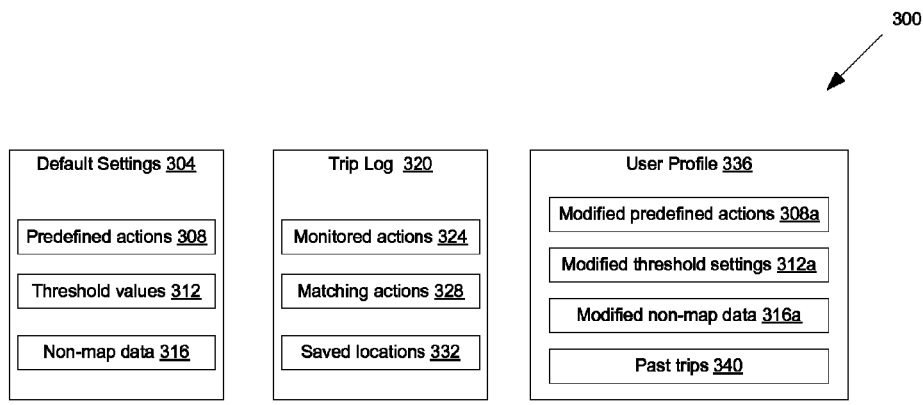
FIG. 3 is a schematic block diagram of information compiled and/or used by the method depicted in FIG. 2, according to an embodiment of the invention.

Referring now to FIGS. 2-3, according to an aspect of the disclosed invention, the method 200 maintains a data set 300 that may include a set of default settings 304, a trip log 320, and a user profile 336. Using the data set 300, the method 200 may apply preconfigured settings to a monitored trip, maintain a record of that trip, and allow user-specific modifications, as described in conjunction with the disclosed embodiments of the invention, below. In step 204, the method 200 may allow the user to submit coordinates of a point of origin (the "origin") and a destination to the method 200 via, for example, a graphic user interface (GUI) of a navigational device (such as those described in FIGS. 1A-B). The method 200 may record this information using saved locations 332 and refer to them as necessary. The method 200 may, in step 204, also recommend a path between the origin and destination based on the origin and destination, and display a corresponding map or map fragments that graphically represent the user's position and movement in relation to the user's geographical environment.

It is not necessary to the practice of the invention for a user to provide such coordinates or for the method to recommend a path using such coordinates. Whether or not such coordinates are provided, the user may begin to travel away from the origin (or a point of origin as detected and monitored by the method 200 in step 204) towards the destination, or another point that is not necessarily communicated to the method 200 by the user. The method 200 may track the user's current position in step 204 as the user travels, and may identify and track the user's travel pattern and the user's progress towards or away from the destination (or the user's travel pattern, generally), and maintain the information in a set of monitored actions 324. The monitored actions 324 and travel patterns may include, without limitation, the user's speed, direction, the number of turns taken, frequency of divergence from a recommended path (if a path was in fact recommended), and frequency of travelling a portion of the recommended path (or another path) in a given time period (i.e., "going in circles"). Such actions may indicate that the user is lost and/or unfamiliar with the user's surroundings. Whether or not the user has indicated a point of origin or destination, or received a recommended path, the method's 200 determination that the user may be lost, the user may benefit from receiving corrective data (the mechanism for which is described in greater detail below).

With continued reference to FIGS. 2-3, the method 200 may analyze the user's current location and travel pattern (monitored in step 204 and recorded in the set of monitored actions 324) to determine a probability that the user is lost, in step 208 and in need of assistance. The method 200 may make such a determination by comparing the user's recorded actions 324 with one or more predefined actions 308 that the method 200 considers as indicators of the user being lost. Such actions may differ from one embodiment of the disclosed invention to another. Where the invention is deployed in a car's GPS unit, for example, these actions may be defined relative to driving patterns. The predefined actions in this context may include, without limitation, the user driving on a portion of a path (for example, the recommended path) in one direction, and driving on the same portion of the path in an opposite direction in a short time period (i.e. going in reverse over a particular path). This pattern may suggest that the user is backing up because the user believes to have traveled the wrong way. The predefined actions 308 used by the method 200 may also include "going in circles", which may be defined as the user travelling a distance x without reducing its distance y from the destination by the same amount during a time period t, or where the difference between x and y exceeds a threshold distance z. For example, during a fifteen-minute period t travelling at an average of 60 miles per hour (mph), the user may travel 15 miles in 15 minutes, but may have traveled 10 miles away from the destination. The method 200 may determine, in step 208, that monitored action 324 is an indication that the user may be lost. This determination may take into account the fact that the origin and destination points are not connected by straight-line paths; it may account for the need for the user to travel curved and parallel paths. The method 200 may also determine that the user is more likely to be lost if the user veers off a recommended path, or enters a dead-end road that cannot be used to reach the destination.

With continued reference to FIGS. 2-3, the method 200 may, in step 208, maintain a record of matching actions 328 corresponding to instances when the user's monitored actions 324 correspond to one or more of the predefined actions 308. As the number of matching actions 328 increases, so does the likelihood that the user is lost. The method 200 may, in step 208, compare the number of matching actions 328 to one or more threshold values 312 to determine the likelihood that the user is lost. According to an exemplary embodiment of the disclosed invention, the method 200 may define "lost" as: a condition where the user has performed five matching actions 328 in a 15 minute period, with the probability of being lost under these conditions at 1 or 100%. The method 200 may evaluate the matching actions 328 against this setting and a threshold value 312. One matching action 328, for example, would constitute a 1 out of five match, or 0.4, or 20%. A matching action may be ignored, in this example, 15 minutes after it was first observed. According to alternative embodiments, "lost" may be defined as a condition where the user has performed five matching actions 328 in a distance equaling 15% of the total estimated trip distance. The threshold values 312 may further include multiple threshold values, with increasing likelihoods of being lost resulting increasing levels of navigational support being offered by the method 200. Furthermore, different predefined actions may have different weights, such that veering off a recommended path (if one is recommended), for example, may have a higher weight than reversing.

With continued reference to FIGS. 2-3, if the probability of being lost reaches a predefined threshold value (for example, 60%), the method 200 may provide the user with corrective data in step 212 to assist the user to take corrective action or to avoid getting lost any further (or with finding a path to the destination if the destination is known to the method 200 and/or a path is recommended). In the above example, 3 matching actions would result in a probability of being lost equaling 0.6 or 60%, and would thus meet the threshold value. The method 200 may provide the user with assistance at this point, in step 212.

Corrective data may include non-map data, additional map data relative to existing map data, or both. Map data includes road layouts and names. Non-limiting examples of non-map data include: communicating with the user through an enhanced mode of communication (for example, if the default setting is to only display a visual map, the enhanced mode of communication may include audio, photographic, or video data corresponding to intersections or streets); modifying the amount, repetition, tone, speed, or emphasis of audio data (for example, if the user is initially provided with a male voice, the method 200 may switch to a more soothing female voice to ease the user's stress while being lost); communicating information about landmarks or astrological bodies which might otherwise not have been offered to the user (e.g., a famous building, a location of a well known retailer or chain restaurant, the location of the moon or the sun, etc.). The method 200 recognizes that although the user may be provided with customary map information on a navigation device, the user may still be. When the user repeatedly performs a matching action 328, there is an increasing likelihood that the customary map data is insufficient to direct the user's travel. The method 200 recognizes, therefore, that additional map data, and/or non-map data may be helpful to the user in taking a corrective action or in avoiding getting lost.

Figure 4:
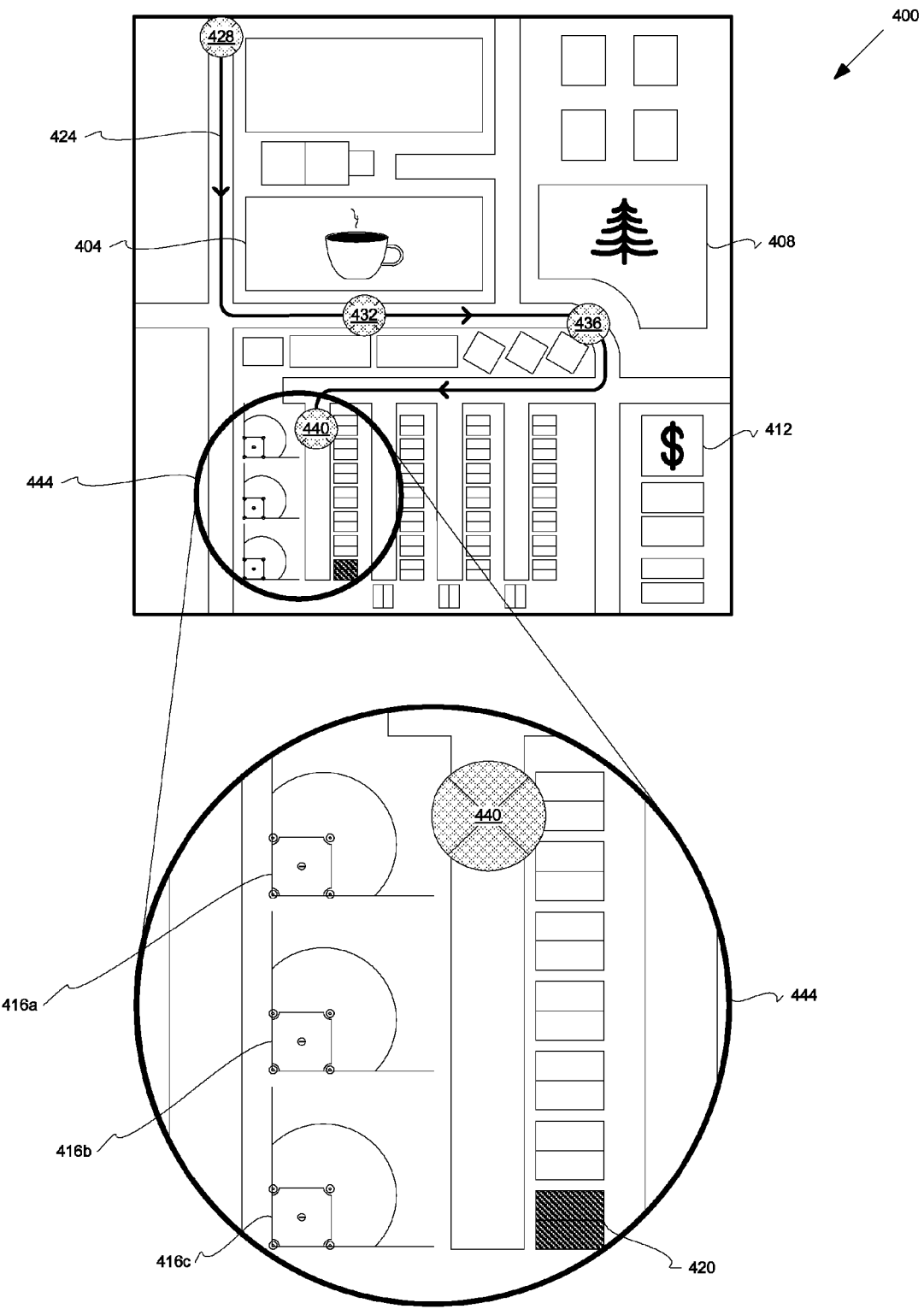
FIG. 4 is a schematic block diagram depicting a map of a geographical region, according to an embodiment of the invention.

Referring now to FIGS. 2-4, according to an exemplary embodiment of the disclosed invention, the method 200 may provide the user with a map 400 of an area that the user is travelling through. The method 200 may, in step 204, prompt the user for a point of origin 428 (or it may detect the user's point of origin, or simply the user's current position), and may further prompt the user for a destination 420 (although this is not required). The method 200 may present the user with a recommended path 424 based on the origin and destination points (or monitor the user's travel path based on the user's current position). As the user begins to travel on the recommended path 424 (for example, in a vehicle, on a bike, or while walking), the method 200 may detect, in step 208, that the probability that the user is lost has exceeded a first threshold value 312, and that the user is in need of corrective data, such as non-map data 316 or additional map data to take a corrective action, or to avoid getting lost in unfamiliar areas.

Having determined that the user is lost (alternatively, the user may indicate that the user needs added navigational support), the method 200 may continue to track the user's current position at or near the location 428 along the recommended path 424. The method 200 may inform the user, in step 212, that the user should turn left at a first intersection, where the user should expect to see a coffee shop 404 on the user's left-hand side. The method 200 may thus inform the user through an audio instruction or by presenting a photograph or video of the intersection or the coffee shop 404. Such non-map data may be exclusively in audio format or in a visual format; alternatively, it may be in a combination of these and other formats. As the user continues on the recommended path 424 and reaches a location 432, the method 200 may instruct the user to travel straight past the coffee shop 404, on the user's left-hand side, towards a park 408. At a location 436, the method 200 may instruct the user, in step 212, to follow a curved path past the park 408 to the user's left-hand side, and to make a right turn at a first intersection after the park 408, where the user can expect to see a bank 412 across the intersection to the user's left-hand side. The method 200 may also provide the user with information about the location of astrological bodies (not shown). For example, the method 200 may inform the user through audio data, a video, a photograph, a graphic, or otherwise, that the user should expect to see the sun, the moon, or other astrological body on the user's right hand side as the user travels on a particular stretch of road.

With continued reference to FIGS. 2-4, in the exemplary map 400 depicted in FIG. 4, the destination 420 may be one of several structures situated in a relatively small area of the map 400, such that the destination 420 may be difficult for the user to find in the map 400 as displayed. This difficulty may lead the user to perform one or more matching actions 328 that increase the probability that the user is lost. For example, the user may drive back and forth on a particular road looking for the destination 420. The method 200 may detect, in step 208, that the probability that the user is lost has increased at or about a location 440, reaching a second threshold value 312 higher than the first threshold value 312 described above. The method 200 may, according to one embodiment of the disclosed invention, present the user with a new map 444 showing a different, more detailed scale view than the map 400. The new map 444 may correspond to a region at or around the location 440, and may show additional map details (or make existing map details clearer), and/or non-map data, as described above. For example, the method 200 may present the user, in step 212, with audio or visual data informing the user that the destination 420 is located past two consecutive baseball fields 416a and 416b, and across from a third baseball field 416c adjacent to the first two baseball fields. By providing this additional level of detail and non-map data, the method 200 makes it easier for the user to take corrective action (i.e. finding the destination 420), or to avoid being lost in the first place. Such corrective data (including the non-map data) may be more useful to the user than customary map data, such as a building number and a street name of the destination 420 that correspond, for example, to its postal address.

Referring now to FIGS. 2-3, according to a further embodiment of the disclosed invention, the method 200 may allow a user to maintain a user profile 336 that includes a set of modified predefined actions 308a, modified threshold settings 312a, modified non-map data 316a, and past trips 340. The modified predefined actions 308a correspond to a subset of the predefined actions 308 that are selected by the user for monitoring by the method 200 in step 204. For example, the user may wish for the method 200 not to treat multiple trips on the same path during a short period of time as an indicator of the user being lost. Alternatively, the user may wish for the method 200 to place less emphasis on such actions than other predefined actions 308. Other embodiments of the invention may allow the user to specify the kind and amount of corrective data (non-map data and/or additional map data) to be provided by the method 200 in step 212, even when the user is not lost. For example, the user may know, ahead of travelling to a destination, that the user is unfamiliar with parts or all of the route to be taken, and may wish to be provided with the method's 200 features. According to a further embodiment of the invention, the method 200 may recognize that the user frequently gets lost. A frequently lost user may be defined, according to one embodiment, as one that performs 10 matching actions 328 in three consecutive past trips 340. Therefore, the method 200 may adjust its default predefined actions 308, threshold settings 312, and non-map data 316 to accommodate a user's monitored actions 324 that are retained as part of the user's past trips 340.

With continued reference to FIGS. 2-3, an additional embodiment of the invention may allow the user to specify the type of corrective data (including non-map data and/or additional map data) to be provided by the method 200. For example, the user may instruct the method 200 never to offer audio data. In each of the above described embodiments, a single user may have multiple profiles and preset preferences to accommodate the user under different circumstances.

Referring now to FIGS. 1-3, further embodiments of the disclosed invention may allow a navigational device (e.g. a GPS device 108 or a mobile device 112) to offer navigational support to more than one user. Such functionality may be implemented at the device level (e.g., a program on the GPS device 108 may allow for local maintenance of multiple user profiles 336), or it may be implemented as a functionality by the servicer provide 104 on the service provider's 104 data infrastructure (for example, one or more systems 10 that offer cloud computing services).

Referring now to FIGS. 1-2, according to a further embodiment of the disclosed invention, the method 200 may provide corrective data to a user though a series of fractal maps according to the user's current location and the likelihood that the user is lost (determined based on the user's travel pattern). The term "fractal" denotes variations in scale and/or modality of information associated with a geographical location represented on the map. According to the disclosed embodiments of the invention, fractal data sets are corrective data and may include non-map data and/or map data. For example, where there is a sufficient likelihood that the user is lost while travelling on a road, the method 200 may present the user with photographs or detailed animated videos of an intersection as the user approaches it. As another example, if there is a sufficient likelihood that the user is lost while travelling through a shopping mall, the method 200 may change its display of a map of the shopping mall to pictures of the storefronts in the mall to assist the user in navigating better in the area. If the user needs additional assistance, the method 200 may provide additional fractal maps or data sets such as maps or pictures of shelves inside the store, or detailed information about the products on those shelves. This may be useful, for example, where the user exhibits a travel pattern suggesting that the user is lost because the user cannot find a particular item. By providing detailed product information for the items on the shelves, the method 200 may help the user's shopping experience. In each example, the fractal data set may be presented along with the map information that the method 200 may initially have provided to the user.

Figure 5A:
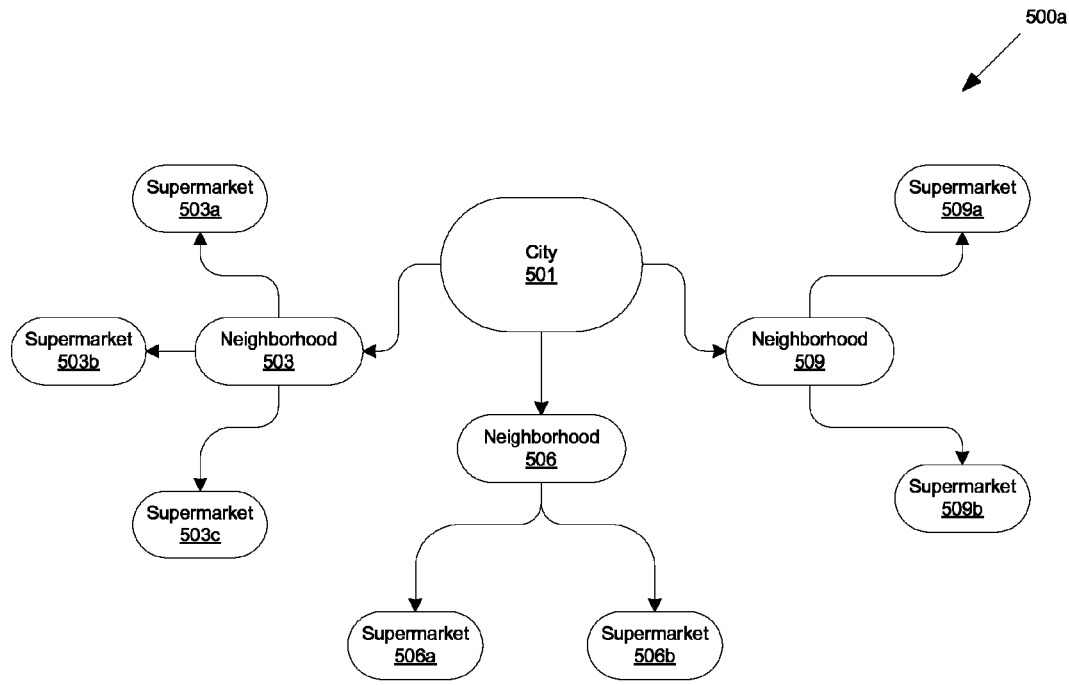
FIG. 5A is a schematic block diagram depicting a series of scaled maps in relation to one another, according to an embodiment of the invention.

Referring now to FIGS. 1-2 and 5A, according to an exemplary embodiment of the disclosed invention, a user may be presented with one or more fractal maps 500a (i.e., maps that have fractal data sets associated with them) via the method 200. The user may be, for example, a shopper accessing the method 200 through a mobile device 112 during a shopping trip. The mobile device 112 may communicate with a mapping service (not shown) through the service provider 104. The service provider 104 may be, for example, a cellular network operator that allows the mobile device to connect to a third-party's servers running a mapping service. The method 200 may monitor the shopper's current position in step 204 and may allow the shopper to search for a product. In response to the search, the method 200 may determine that the product is offered at one or more supermarkets in the city where the user is located. The method 200 may provide the shopper, in step 204, with one or more of the series of fractal maps 500*a* that are available through the mapping service.

With continued reference to FIGS. 1-2 and 5A, the fractal maps 500*a* may include a city map 501, which in turn includes three neighborhood maps 503, 506 and 509; and interior maps of supermarkets in each of those neighborhoods, including: the supermarkets 503*a*, 503*b*, and 503*c* in the neighborhood 503; the supermarkets 506*a* and 506*b* in the neighborhood 506; and the supermarkets 509*a* and 509*b* in the neighborhood 509. Additional maps (not shown) at other scales or maps having other information may be available through the mapping service.

Figure 5B:
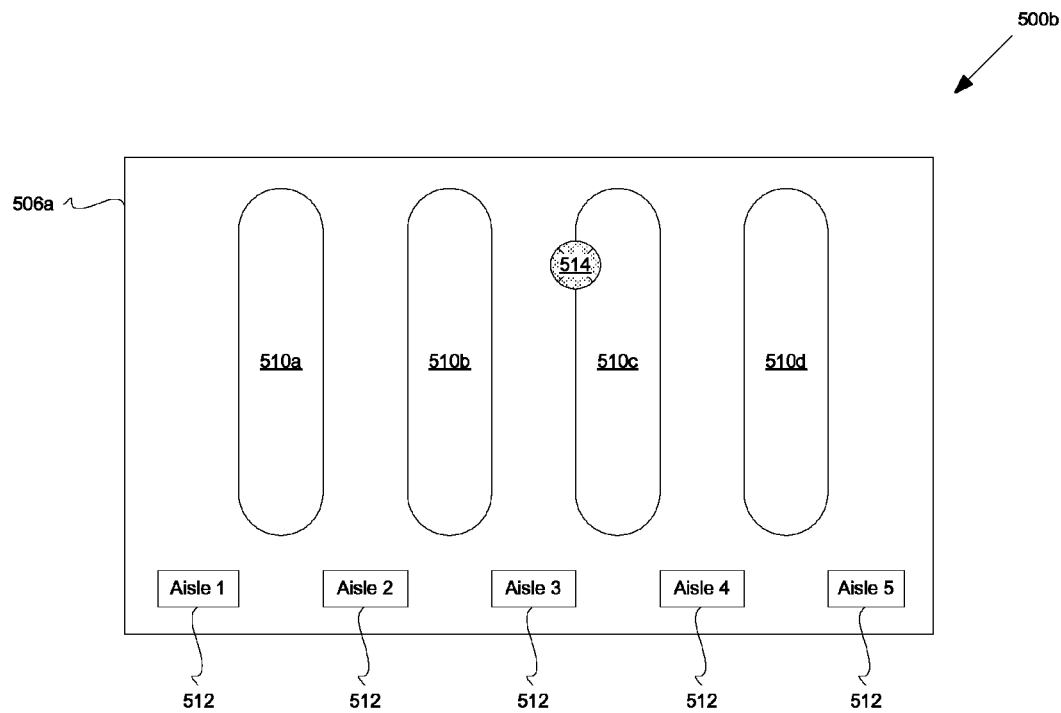
FIG. 5B is a schematic block diagram depicting an interior map of a supermarket depicted in FIG. 5A, according to an embodiment of the invention.
Figure 5C:
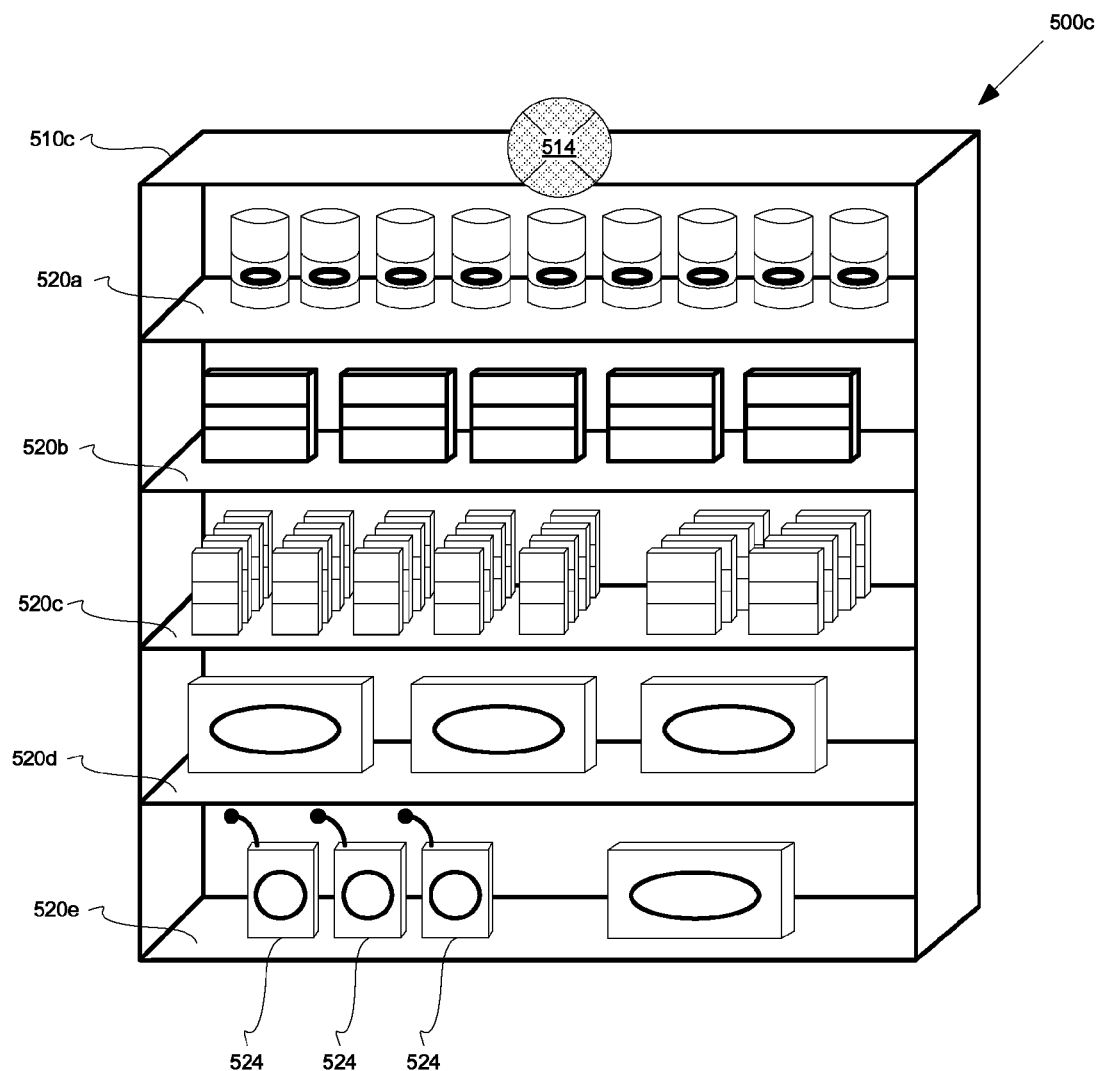
FIG. 5C is a schematic block diagram depicting the contents of a shelf structure in the supermarket depicted in FIG. 5B, according to an embodiment of the invention.

Referring now to FIGS. 2 and 5A-B, the method 200 may continue to monitor the shopper's current position as the shopper approaches the supermarket 506*a* in neighborhood 506. Alternatively, the shopper may select the supermarket 506*a* and communicate the selection to the method 200 (for example, through a user interface of a navigation device). The method 200 may provide the shopper with a recommended path to the supermarket 506*a*. When the shopper arrives at or near supermarket 506*a*, the method 200 may present the shopper, in step 204 (or, if the shopper is considered lost, in step 212), with an interior map 500*b* of the supermarket 506*a*, as depicted in FIG. 5B. The interior of the supermarket 506*a* may include a series of two-sides shelf structures 510*a-d*, each flanked by two aisles 512, wherein an aisle 512 may be shared by two adjacent shelf-structures 510-*a*. In the depicted example, there are four shelf structures 510*a-d* (each having two shelved sides), and five aisles 512 (Aisle 1-5). The interior map may indicate a location 514 within the supermarket 506*a* where the searched-for product (not shown) is offered for sale. In the depicted example, the location 514 corresponds to the shelf-structure 510*c* at Aisle 3.

With continued reference to FIGS. 2 and 5A-B, as the user travels towards the location 514, the method 200 may continue to monitor the user's current position and travel pattern in step 204. The user may be unable to locate the searched-for product, and may perform one or more matching actions 328 (i.e., the user's monitored actions 324 may match the predefined actions 308). In step 208, the method 200 uses the observations of the monitoring step 204 to determine that there is an increasing likelihood that the user is lost. According to this embodiment, a travel pattern of the shopper spending more than a predetermined amount of time t at or near the location 514 may be an indication that the shopper is unable to locate the searched-for product from among potentially hundreds of items displayed at the location 514. Additional predefined actions, according to this embodiment, may include pacing back and forth (defined, for example, as travelling in the same aisle 510*c* more than once in opposite directions after first entering the aisle 510*c*). Once the probability of the user being lost, calculated based on the shopper's matching actions 328, reaches a threshold value 312, the method 200 may provide the user with a more detailed map in the set of fractal maps 500*a*, in steps 204 and 212, as described below.

Referring now to FIGS. 2, and 5A-C, the method 200 may provide the shopper with additional map information or non-map data in step 212, such as a map 500*c* (shown in FIG. 5B), corresponding to the contents of the shelf structure 510*c* at Aisle 3 at the location 514 (as shown in FIG. 5A). In the map 500*c*, the shelf structure 510*c* has five shelves 520*a-e*. The method 200 may indicate to the user, via non-map data or additional map data (in step 212), or default level map data (in step 204), that the searched-for product 524 (the "product 524") is located on the shelf 520*e*, the bottom shelf in the shelf structure 510*c*. According to a related embodiment, if the shopper is still "lost" (i.e., the shopper performs a series of matching actions 328 that meet a threshold value) while at the location 514 (where, for example, the shopper still cannot locate the product 524 because it may no longer be in stock, or simply out of sight), the method 200 may detect such a state in step 208, and provide the shopper with another map at a different scale in the series of maps 500*a* that displays other supermarkets near the shopper's current location that may offer the product 524 for sale.

With continued reference to FIGS. 2 and 5A-C, although the function of offering fractal maps (i.e., displaying a new map to the shopper or to a user, in general, at changing scales or modalities when the likelihood that the shopper is lost exceeds a threshold value 312) may occur in step 212 of the method 200, such functionality may additionally or alternatively be performed as part of the step 204 without a determination in step 208 that the user may be lost. In other words, while providing a different scale level map may constitute "non-map data", as the term is defined in embodiments of the disclosed invention, such functionality may be offered as a default feature in step 204 of the method 200. For example, as a user approaches a shopping mall, the method 200 may download and present to the user, from the mapping service, a map of all the shops in the mall. As the user approaches an individual store, a map at a different scale showing the interior of the shop and locations of products may be downloaded and presented to the user. As the user approaches a particular set of shelves, another map may be downloaded and presented to the user showing all the products on those shelves.

Referring now to FIGS. 2-3, according to another embodiment of the invention, the method 200 may monitor the user's current position and travel pattern in step 204, and determine a probability that the user is lost in step 208. If the probability exceeds the threshold value 312, the method 200 may analyze the map data available to it to determine whether the map data is outdated. That map data is outdated may be one reason why the user is lost. Presenting the user with updated map data may, therefore, assist the user in taking corrective action and prevent getting lost again.

Figure 6:
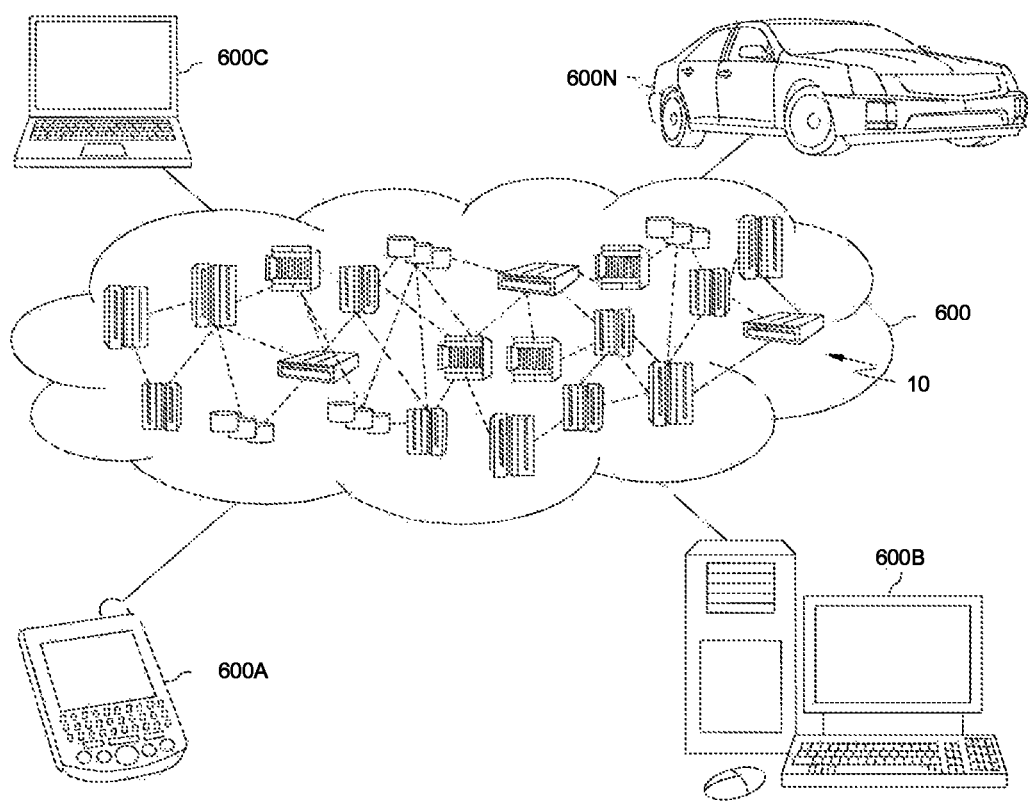
FIG. 6 is a schematic block diagram of an illustrative cloud computing environment, according to an embodiment of the invention.

Referring now to FIG. 6, an illustrative cloud computing environment 600, according to a further embodiment of the disclosed invention, is depicted. As shown, the cloud computing environment 600 comprises one or more cloud computing nodes 10 with which local computing devices used by cloud consumers, such as, for example, a personal digital assistant (PDA) or a cellular telephone 600A, a desktop computer 600B, a laptop computer 600C, and/or an automobile computer system 600N, may communicate. The nodes 10 may communicate with one another. They may be grouped (not shown) physically or virtually, in one or more networks, such as Private, Community, Public, or Hybrid clouds as described hereinabove, or a combination thereof. This allows the cloud computing environment 600 to offer infrastructure, platforms and/or software as services for which a cloud consumer does not need to maintain resources on a local computing device. It is understood that the types of computing devices 600A-N shown in FIG. 6 are intended to be illustrative only and that the computing nodes 10 and the cloud computing environment 600 can communicate with any type of computerized device over any type of network and/or network addressable connection (e.g., using a web browser).

Figure 7:
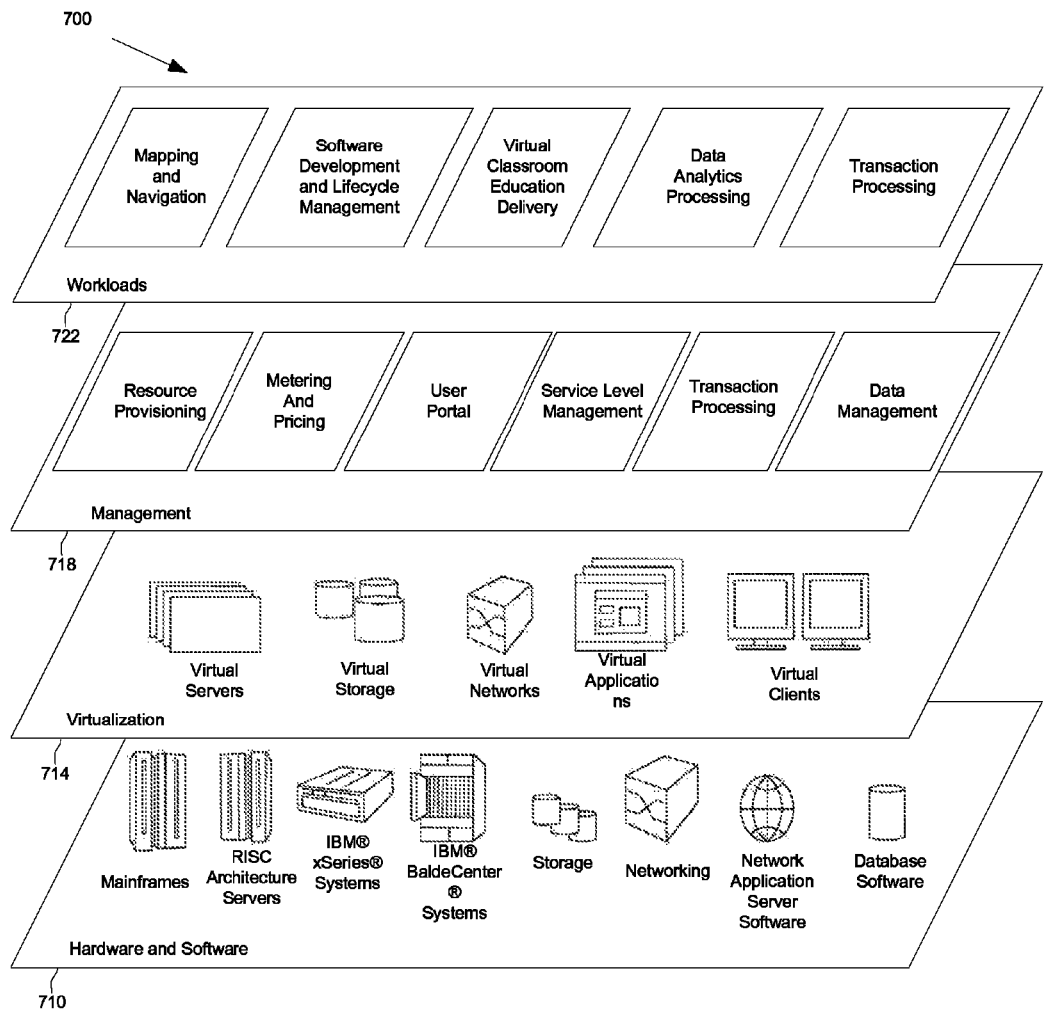
FIG. 7 is a schematic block diagram for a multi-layered functional illustration of the cloud computing environment depicted in FIG. 6, according to an embodiment of the invention.

Referring now to FIG. 7, a set of functional abstraction layers provided by the cloud computing environment 600 (FIG. 6) is shown. It should be understood in advance that the components, layers, and functions shown in FIG. 7 are intended to be illustrative only and embodiments of the invention are not limited thereto. As depicted, the following layers and corresponding functions are provided.

The hardware and software layer 710 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

The virtualization layer 714 provides an abstraction layer from which the following examples of virtual entities may be provided: virtual servers; virtual storage; virtual networks, including virtual private networks; virtual applications and operating systems; and virtual clients.

In one example, the management layer 718 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

The workloads layer 722 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a management system for transferring VM images 208, such as the method 100.

While the present invention is particularly shown and described with respect to preferred embodiments thereof, it will be understood by those skilled in the art that changes in forms and details may be made without departing from the spirit and scope of the present application. It is therefore intended that the present invention not be limited to the exact forms and details described and illustrated herein, but falls within the scope of the appended claims.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a nonexhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

We claim:

1. A method for providing navigational support on a computer device, comprising:
    monitoring a user's travel pattern and current position on a map, wherein the user's travel pattern includes travelling a distance during a defined time period;
    determining a probability that the user is lost based on the user's travel pattern, and current position such that the user's distance from the destination increases beyond a the distance during the defined time period; and
    providing the user with the plurality of corrective data if the probability that the user is lost exceeds a threshold, wherein at least one of the above steps is performed by a computer.

2. The method of claim 1, wherein the corrective data includes non-map data and/or additional map data.

3. The method of claim 1, wherein the user's travel pattern includes travelling on a path in a first direction, and travelling on the path in a reverse direction within a defined time period.

4. The method of claim 1, wherein the user's travel pattern includes diverging from a recommended path.

5. The method of claim 1, further comprising:
    maintaining a user profile that includes a record of the user's travel pattern in the past;
    providing the user with the corrective data based on the user profile.

6. The method of claim 1, wherein the corrective data includes a fractal data set.

7. The method of claim 2 wherein the non-map data includes: audio data, video data, digital photographs, a landmark location relative to the user, or an astrological body location relative to the user.

8. The method of claim 1, wherein the step of providing corrective data includes determining a current manner for presenting audio data to the user and providing the user with audio data in a new manner.

9. The method of claim 1, wherein the threshold is determined based on a set of past travel patterns of the user.

10. The method of claim 1, wherein the plurality of corrective data is provided to the user based on a set of past travel patterns of the user.

11. A system for providing navigational support on a computer device, comprising:
    a computer having a processor, and a computer-readable storage device; and
    a program embodied on the storage device for execution by the processor, the program having a plurality of program modules, including:
        a monitoring module configured to monitor a user's travel pattern and current position on a map wherein the user's travel pattern includes travelling a distance during a defined time period;
        a determining module configured to determine a probability that the user is lost based on the user's travel pattern and current position such that the user's distance from the destination increases beyond a the distance during the defined time period; and
        a providing module configured to provide the user with the plurality of corrective data based on the user profile if the probability that the user is lost exceeds a threshold.

12. The system of claim 11, wherein the corrective data includes: non-map data and/or additional map data.

13. The system of claim 11, wherein the computer is a global positioning satellite (GPS) device.

14. The system of claim 11, wherein the computer is a mobile device.

15. The system of claim 11, further comprising:
    a plurality of additional computers each having a processor and a computer readable storage device, wherein one or more of the modules of the program are executed by one or more of the processors of the plurality of additional computers.

16. A computer program product for providing navigational support on a computer device, comprising a computer-readable storage medium having program code embodied therewith, the program code readable/executable by a processor of a computer to perform a method comprising:
    monitoring, by the processor, a user's travel pattern and current position on a map, wherein the user's travel pattern includes travelling a distance during a defined time period;
    determining, by the processor, a probability that the user is lost based on the user's travel pattern and current position such that the user's distance from the destination increases beyond a the distance during the defined time period; and
    providing, by the processor, the user with a plurality of corrective data based on the user profile if the probability that the user is lost exceeds a threshold.

17. The computer program product of claim 16, wherein the corrective data includes: non-map data and/or additional map data.

18. The computer program product of claim 17, wherein the non-map data includes audio data, video data, digital photographs, a landmark location relative to the user, or an astrological body location relative to the user.

19. The computer program product of claim 16, wherein the user's travel pattern includes travelling on a path in a first direction, and travelling on the path in a reverse direction within a defined time period.

\* \* \* \* \*